(12) United States Patent
Krohn et al.

(10) Patent No.: US 7,653,914 B2
(45) Date of Patent: Jan. 26, 2010

(54) HANDLING DIFFERENT SERVICE VERSIONS IN A SERVER

(75) Inventors: Petri Krohn, Helsinki (FI); Harri Jäske, Espoo (FI)

(73) Assignee: Nokia Corporation, Espoo (FI)

( * ) Notice: Subject to any disclaimer, the term of this patent is extended or adjusted under 35 U.S.C. 154(b) by 570 days.

(21) Appl. No.: 10/312,144

(22) PCT Filed: Apr. 23, 2002

(86) PCT No.: PCT/FI02/00335

§ 371 (c)(1),
(2), (4) Date: Apr. 4, 2003

(87) PCT Pub. No.: WO02/086702

PCT Pub. Date: Oct. 31, 2002

(65) Prior Publication Data

US 2003/0167349 A1 Sep. 4, 2003

(30) Foreign Application Priority Data

Apr. 23, 2001 (FI) .................................. 20010828

(51) Int. Cl.
*G06F 9/00* (2006.01)
*G06F 9/44* (2006.01)
*G06F 9/45* (2006.01)
*G06F 7/00* (2006.01)

(52) U.S. Cl. ........................ 719/328; 717/122; 717/153; 717/166; 717/170; 707/101

(58) Field of Classification Search ................ 719/328, 719/331; 717/170, 153, 166, 122; 707/101
See application file for complete search history.

(56) References Cited

U.S. PATENT DOCUMENTS

| 5,805,899 A | | 9/1998 | Evans et al. |
| 5,937,409 A | * | 8/1999 | Wetherbee ............... 707/103 R |
| 5,960,204 A | * | 9/1999 | Yinger et al. ................ 717/176 |

(Continued)

FOREIGN PATENT DOCUMENTS

EP 0 849 666 6/1998

(Continued)

OTHER PUBLICATIONS

Kawanami, "Hosting Active DLL Server Components in Jagua", Jan. 26, 200, pp. 1-8.*

(Continued)

*Primary Examiner*—Van H Nguyen
*Assistant Examiner*—Phuong N Hoang
(74) *Attorney, Agent, or Firm*—Squire, Sanders and Dempsey L.L.P.

(57) ABSTRACT

This invention relates to handling of different service versions in a server that is connected to a communication network. The invention comprises means to load a desired version, two tables and additional data for handling different service versions. The first table contains service key and version information, and serialized service objects. The second table contains names of classes, version information and class files. The additional data is needed for loading the right class from among classes, with the same name, and mapping the right service object version to the right versions of classes.

31 Claims, 5 Drawing Sheets

U.S. PATENT DOCUMENTS

| | | | |
|---|---|---|---|
| 5,960,436 A * | 9/1999 | Chang et al. | 707/101 |
| 5,970,252 A * | 10/1999 | Buxton et al. | 717/166 |
| 5,974,428 A | 10/1999 | Gerard et al. | |
| 6,035,303 A | 3/2000 | Baer et al. | |
| 6,085,198 A * | 7/2000 | Skinner et al. | 707/103 R |
| 6,185,734 B1 | 2/2001 | Saboff et al. | |
| 6,195,796 B1 | 2/2001 | Porter | |
| 6,253,256 B1 * | 6/2001 | Wollrath et al. | 719/330 |
| 6,962,729 B2 * | 11/2005 | Tokas et al. | 427/302 |
| 2004/0055005 A1 * | 3/2004 | Creswell et al. | 719/315 |

FOREIGN PATENT DOCUMENTS

| | | |
|---|---|---|
| WO | WO 01/93018 A2 | 12/2001 |
| WO | WO 01/93019 A2 | 12/2001 |

OTHER PUBLICATIONS

"Enabling Flexible Cross-Version Interoperability for Distributed Services", Senivongse, In: Distributed Objects and Applications, Sep. 1999. Proceedings of the International Symposium on. pp. 201-210.

"Build an object Database", Hughes et al, found in the internet at: http://www.javaworld.com/javaworld/jw-01-2000/jw-01-step_p.html, Jan. 2000, kohta "versioning". pp. 1-17.

* cited by examiner

TABLE B

| CLASS NAME | CLASS VERSION | DATA |
|---|---|---|
| COMP 1 | 06.07.00 | CODE, STATE, ETC... |
| COMP 2 | 12.11.99 | CODE, STATE, ETC... |
| COMP 3 | 04.05.00 | CODE, STATE, ETC... |
| . | | |
| . | | |
| COMP N | 04.12.99 | |
| COMP N | 04.01.00 | CODE, STATE, ETC... |

TABLE A

| SERVICE KEY | SERVICE VERSION | OBJECT |
|---|---|---|
| SERVICE 1 | 06.07.00 | BYTES |
| SERVICE 2 | 30.11.99 | BYTES |
| SERVICE 3 | 05.12.99 | BYTES |
| SERVICE 3 | 05.05.00 | BYTES |
| . | | BYTES |
| . | | |
| SERVICE N | 04.12.99 | BYTES |

FIG. 5

HANDLING DIFFERENT SERVICE VERSIONS IN A SERVER

FIELD OF THE INVENTION

This invention relates to handling of different service versions in a server that is connected to a communication network. The server offers services for users. The invention can be used, among other applications, in the provision of telecommunication services

BACKGROUND OF THE INVENTION

At present, a hierarchy (called a multitier architecture) for delivering services to clients comprises three basic elements: client browser, application server and database. See FIG. 1. For example, when a subscriber wants to use a special service, he can download it through the browser (1). The subscriber defines the service in the browser, which sends the service order to the application server (2). The application server executes the service and sends the desired response to the client server. The application server may use the database (3) (or databases) if the application server needs specific data or programs for executing the service.

FIG. 2 shows an example of how a mobile user (5) utilizes services of the application server (2). An intelligent network (4) provides the services to the user. The network can provide the same service to several users (millions of users) at a time. In this example, it is worth of noticing that the intelligent network is more in the role of the user of the services than just a plain transmission network.

Application servers (a server is a device, connected to a network, that provides services, i.e. applications, to network users by managing shared resources) on a network run thousands of different services for up to millions of simultaneous users. Usually the services contain one or more binary format files (executable codes, data). The common way is to use a programming language, such as Java, to form services and virtual machine environment, such as Java virtual machine, to execute services. In the Java environment binary format files are mostly called classes. A class file contains Java virtual machine instructions and a symbol table, as well as other ancillary information. Two or more services can share the same classes.

For understanding the description of the invention, basic structures of the Java language should be kept in mind. Java is an object-oriented programming language. An object is a software component that usually contains executive codes and data. In an object-oriented language actual objects are not defined, but classes of objects are defined. A class is a template for multiple objects with similar features. It can be said that a class describes all common features for all objects in the class. So, a single object is a concrete representation of the class, in other words an instance.

Methods are functions, i.e. executable codes that operate on a class or an object. A stream is a path of communication between the source Of some information and its destination. Java contains several inputstream and outputstream classes for defining different streams. Serializing is a feature in Java environment that makes it possible to save a state of an instance of the class (the concrete representation of a class) in the form of a byte-line. Serialized instances can be deserialized making it possible to use the saved class representation later. To sum up, a Java application comprises classes, which refer to objects. One of the classes is the "root" class, which contains basic methods of the application and makes it possible to get the other classes that belong to the application.

Classes may change occasionally. Old classes may contain errors that are desired to be eliminated, or it may be desired to have a more efficient class version. Different service providers may also use same names for different classes. Due to these items, a service may use a different class version than it has used normally. Let's take an example where a subscriber is using an old browser to get a special service. However, the service has updated for a new browser after the latest subscriber's use of service, and due to this the service do not work properly. Another example can be when a service consists of several classes. Updating one or more classes may cause incompatibilities among the classes in the service. Tedious testing is required for checking compatibility matters between old and new class versions.

In Microsoft WindoWS™ environment and also in Unix environment there are dynamic link libraries, DLLs, comprising reusable software components. The software components needed by applications are distributed as DLLs. Th ere can b e a multitude of applications that use same reusable software components. In other words, a dynamic link library (DLL) is a collection of small programs, which can be called when needed by the executable program or process that is running. For example, the DLL lets the executable program to communicate with a specific device, such as a printer, or it may contain source code to do particular functions.

Furthermore, for example, a program (exe) needs to stem a certain word within a character string it can call the DLL file that contains the function with parameters and a call function. The DLL will tell the executable program the stem form of the word. This allows the executable program to be small in size and it does not need to rewrite the function that has already been written. This allows that any program, needing to stem a word, does not have to write all the source code and to save space on secondary storage as well. DLLs in this fashion are also known as shared files.

The advantage of DLL files is that (because they do not get loaded into random access memory (RAM) together with the main program) space is saved in RAM. Only when and if a DLL file is called, it is loaded. For example, when you are editing a Microsoft Word™ document, the printer driver DLL file does not need to be loaded into RAM. If you decide to print the document, then the printer DLL file is loaded and run.

All in all a DLL is an executable file that cannot be run on it's own, it can only be run from inside an executable file.

When an application is executed it is necessary that the components match the application. For example, in Microsoft Windows™ environment the matching of components and the application is achieved so that when an application is compiled or linked, it recalls the version numbers of the DLLs present in the programming environment. This means that the application is labelled with the version numbers of the DLLs used. When an application is started, it checks the version numbers of the DLLs present in its current execution environment, that is, such as the current computer. If the version numbers present are older than the stamps or labels on the application, the application refuses to run.

In the Microsoft Windows™ environment there can be different versions of components. This is achieved by having path definitions that have different precedencies. The alternative DLLs are stored in different folders. It is usual in many environments that the DLLs and the applications can be installed separately.

It may happen that an application must be run using the components against which it has originally been written and tested. This means, for example, that their versions do not match.

If an application starts to use new versions of installed DLLs problems may occur. This is due to the fact that in the application there can be faults that are corrected accidentally by the old DLLs. Alternatively, the internal logic of a DLL may have change in a way that is not reflected by having new parameters in the interface definition etc.

The problem is worse in service hotel environments, such as network servers, where the applications are developed elsewhere and installed later on to a different execution environment, for example, on a different server. Basically, each possible combination of an application version and its components versions should have to be checked.

In Java, it is possible to serialize and deserialize objects, which means that an object can be transferred to another virtual machine, or the object can later on be reinstantiated having the same state as by the time it was serialized. The state comprises the attribute values of the object attributes and any other objects instantiated within the object prior to serialization.

Also objects referred to within the object are serialized and reinstantiated along the object. The Java property of object serialization and reinstantiation can be used for many purposes, for instance, user interface objects can be instantiated with predefined components such as scrollers, buttons and menus—these are represented as linked subordinate objects that are as well serialized along the object—and certain initial data values.

In Java there is also version control, which sees that deserialized objects are of the same class version as in their original environment. The version control is achieved so that with each serialized object is associated a SUID (Stream Unique Identifier), forming a serial version unique identifier that is stored in addition to the class name and object attribute values in the serialized form. The SUID is a hash value computed on the text format class interface definition comprising method signatures and serialized attributes. In the receiving environment there is a compiled class having the same interface definition. The Java deserializer computes a similar hash value of the target class in the receiving environment. Thereafter, the deserializer checks that the hash values agree.

In Java it is possible to use class loaders, i.e. it is possible to load compiled bytecode comprising a class into the virtual machine. A class can be loaded, for instance, from local filesystem i.e. a specified directory accessed by the computer running the virtual machine. A class can as well be loaded over the Internet using HTTP (Hypertext Transfer Protocol) or FTP (File Transfer Protocol). In many applications it is also useful to store classes into databases. In a virtual machine there can be several class loaders: at least the primordial class loader, that is, the default class loader, and possibly some customized class loaders. The customized class loaders can be used to affect the process of class loading. The benefit of Java class loader mechanism is that the use of customized class loaders is not visible for the programmer when classes to be loaded using the customized loader are instantiated. The classes are just instantiated normally like any new class instances. By having several class loaders, it is possible to have at least two versions of a class having the same name. These two versions of the class can happily co-exist within the virtual machine. Each object memorizes its class loader.

The situation where in a virtual machine there exists two objects within same class names but different class bytecode versions cannot be achieved with just the primodial class loader. The classes have to be loaded using alternative class loaders.

Now the serialization and deserialization process is considered from the service execution environment point of view.

A service execution environment is executing application programs that determine the behaviour of a service for an end-user. The service can be, for instance, a subscriber service within an intelligent telecommunications network or it can be a WWW (World Wide Web) service executing process within a WWW-server environment.

A service can be seen as an instance of a highest-level object. The class code for the object and the objects attribute values determine the behaviour of the service. Of course, the behaviour can be achieved using subordinate objects which are referenced from the highest level object, by calling methods on these objects. References to these objects can be obtained via data read from databases or by just instantiating new objects. The instantiated subordinate objects are deserialized along with the service object itself. As explained before, in large service execution environments there can exist several versions of various subordinate object classes commonly used by different services. When an instance of a service is created, for instance, for a subscriber invoking the service, an initial object instance is formed for the service instance. It is beneficial to instantiate the service instance by deserializing an object instance so that certain initial attribute values can be obtained without unnecessary value initializations and object instantiation. When deserializing the object instance for the service instance, it is necessary to serialize correct versions of the subordinate objects referenced by the service.

This could be done by using object SUIDs to find the correct classes. However, this solution has certain drawbacks such as that the solution only applies for the classes for which there are data references. The solution does not apply to classes that are referenced on code level.

SUMMARY OF THE INVENTION

The invention offers a way to avoid these drawbacks of present technology. The goal of the invention is achieved in a way described in the claims.

The invention is not restricted to the Java environment, but it can also be used in other object-oriented environment. Due to this, it is natural to use Java terms in this text.

In the following description the term service refers to a versioned application i.e. an application of which several versions exist. A service is an application that is implemented and identified as a service object or a cluster of mutually referring objects. Accordingly, a service is invoked by calling a method on the service object. Several versions of the same application can co-exist simultaneously. Each application version can be implemented as a separate service, accordingly as a separate service object.

In the following description the term service repository is a database containing service objects and their associated classes. A service loader retrieves service objects from the service repository based on a service key. The service loader deserializes or otherwise reconstructs the service objects stored persistently in the service repository.

The invention comprises means to load a desired version, a service repository consisting of two tables and additional data for handling different service versions. The first table contains service key and version information, and serialized service objects (an object that contains the all state information of a service). The second table contains names of classes, version information and class files (classes in services). The additional data is needed for loading the right class from among classes, with the same name, and mapping the right service object version to the right versions of classes.

When requesting a service, the service objects are loaded by the service loader from the first table by using the service key provided in the request. Through the service key, the version information and the service objects are reached. Next, the version information is used for forming a version specific class loader. The class loader loads the desired classes included to the service from the second table for the service objects. The class loader uses the version information of the service objects from the first table and the version information of the classes from the second table for mapping the right versions together. The class loader may use other additional data for helping mapping as well.

BRIEF DESCRIPTION OF THE DRAWINGS

In the following the preferred embodiments of the invention are described in more detail with reference to FIGS. 1-7 in the attached drawings wherein FIG. 5 illustrates an example of two tables according to the invention.

DETAILED DESCRIPTION OF THE PREFERRED EMBODIMENTS

As mentioned, the invention aims to solve problems associated with prior art. A goal is to ensure that the most up to date classes are installed with a service. This aims to guarantee that none of classes is older than the latest supposed tested version, i.e. older-than-tested. Thus it can be said that a goal of the invention is that none of the classes is newer-than-tested (a really tested service).

Figure 1:
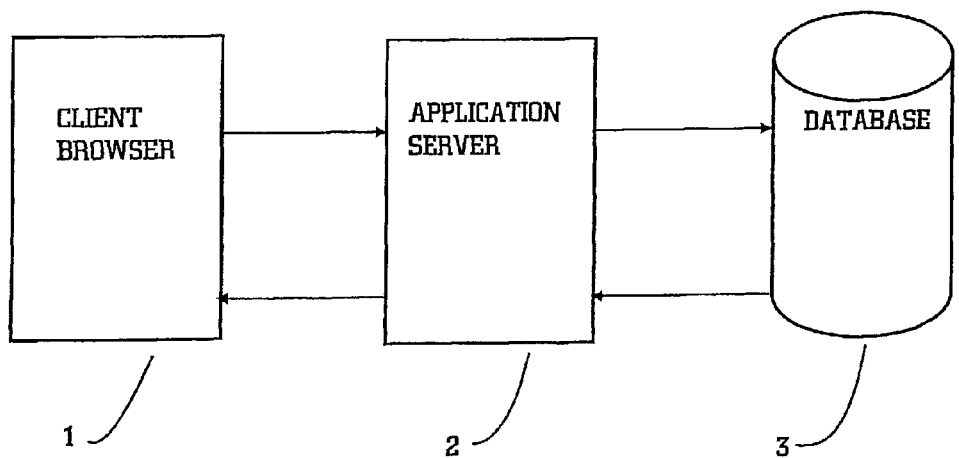
FIG. 1 illustrates an example of the service hierarchy at present communication networks.
Figure 2:
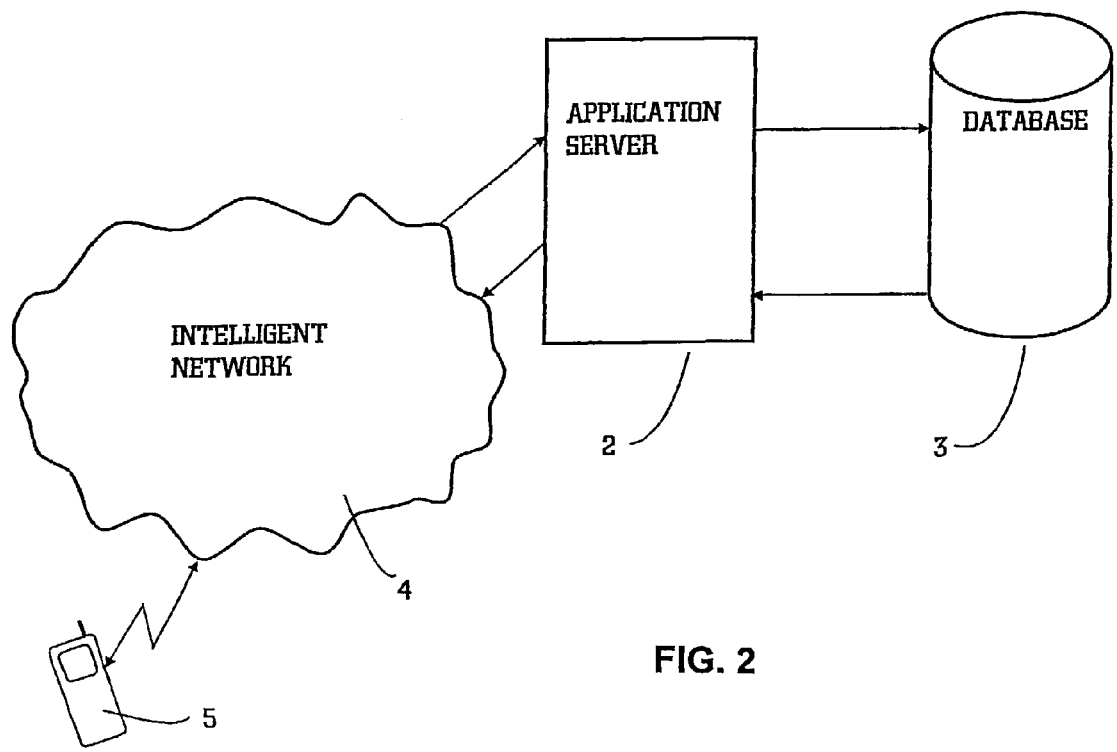
FIG. 2 illustrates an example of the service hierarchy in an intelligent network environment.
Figure 3:
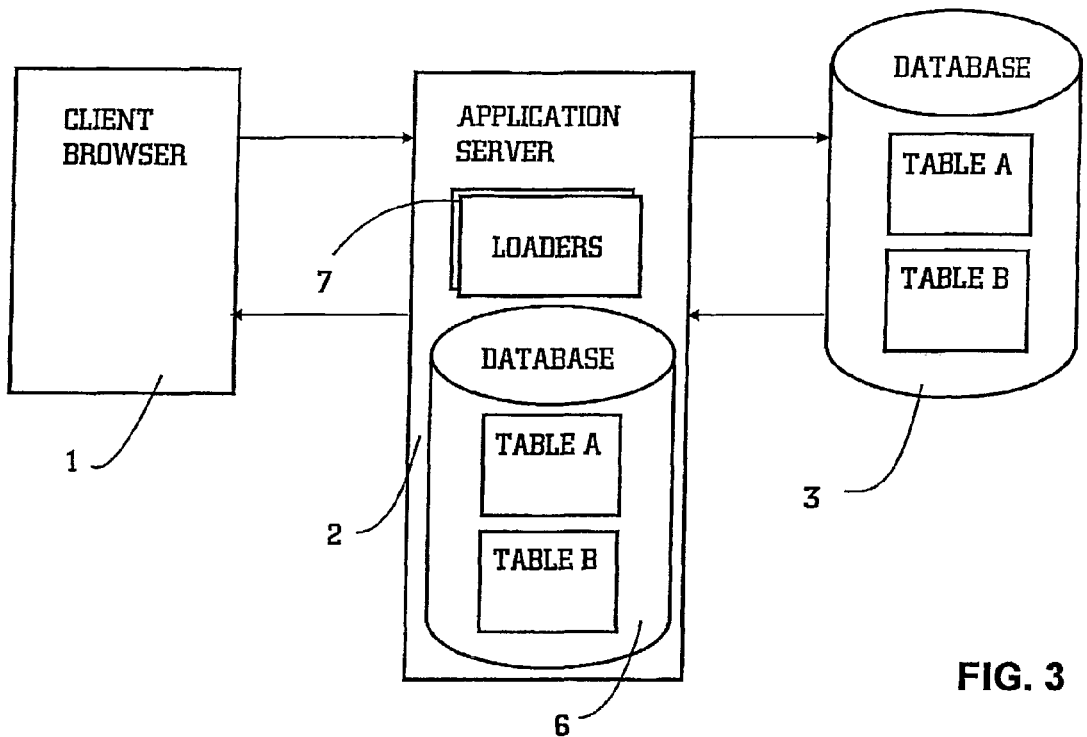
FIG. 3 illustrates an example of how the elements of the invention can be situated at present multitier architecture.

FIG. 3 illustrates an example of how the elements of the inventions can be situated at present multitier architectures. The both tables are in a relation database (6), preferably in an application server (2). The tables can also be in an external database (3). The application server also contains means (7), called service and class loaders, to load desired service components from the database for the use of the application server. When a subscriber wants to use a specific service, he requests it from the application server. The service and class loaders in the application server take care of loading the desired service objects and classes.

After the receiving of the request to execute a service, the service and the class loaders can optionally check first if the service object and classes are in their respective caches. If they are and there is no particular reason to load classes or objects again, the service is ready to run immediately. If some classes or objects are missing or there is a reason for reloading classes or objects, for example a procedure for ensuring right versions, the service and class loaders load the relevant classes and objects from the database. However, normally the service loader and the class loader load the service objects and classes from the database.

Figure 4:
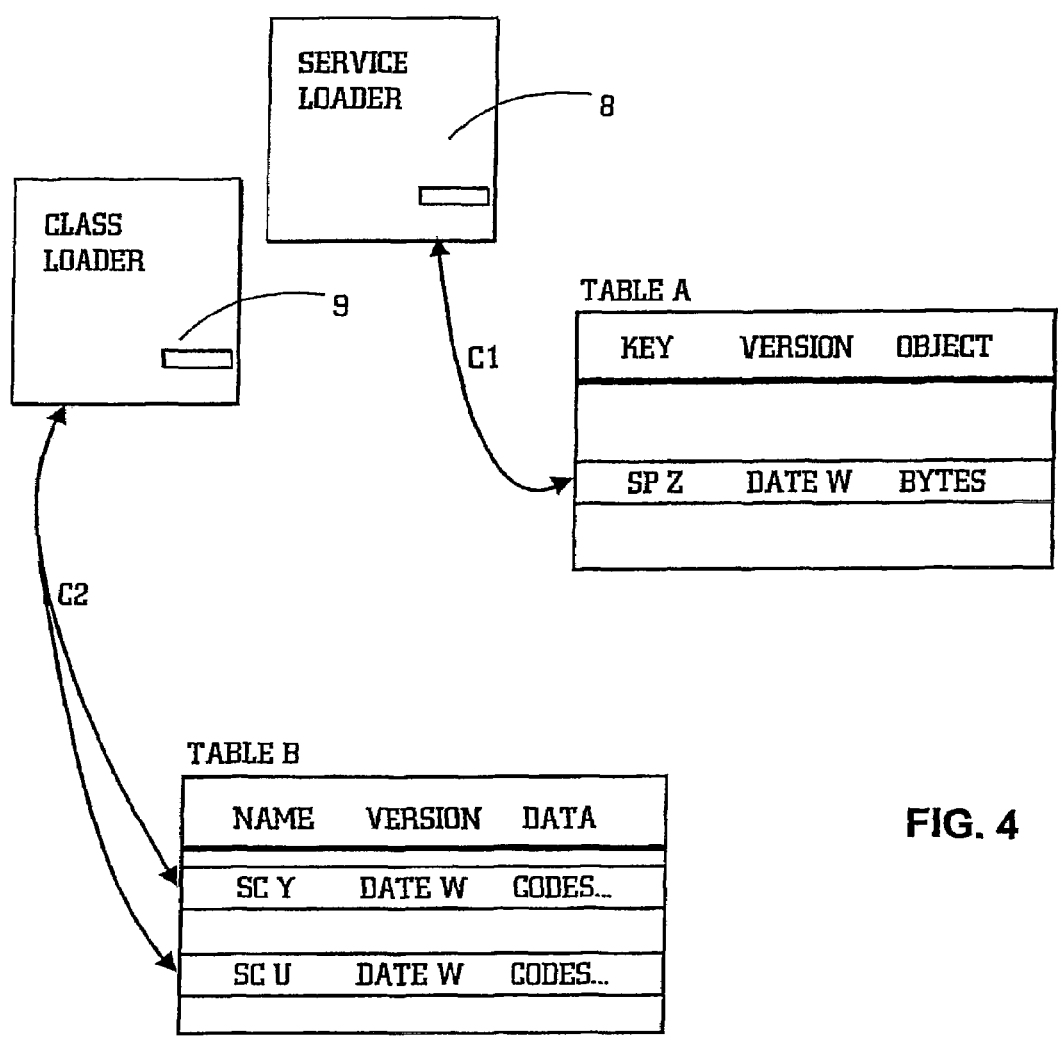
FIG. 4 illustrates an example of searching right components for a service application.

FIG. 4 shows an example of searching the right service object and classes for the execution of a service. The service loader (8) and an executive program knows only the service key (SP Z) of the desired application, i.e. the name of the service object. After searching, based on the service key, the service loader loads (C1) the record of SP Z from Table A. After this, the executive program also knows the version and the classes (information of the classes in the object field) needed based on the record of SP Z.

Now, a version specific class loader (9) is created for searching the right classes in Table B. The new loader is preferably created according to the version information of the loaded service objects. After searching this versioned class loader downloads (C2) the classes, in this case SC Y and SC U, from Table B. In other words, the versioned class loader makes it possible to map the right classes to the right service object. It is worth noticing that each service application may have its own class loader for searching classes. Furthermore, it should be noticed that the versioned class loader can alternatively exist (in some predetermined cases) in which case it does not need to be created.

FIG. 5 shows an example of how to arrange data records according to the invention. As mentioned before, a service comprises a service object and one or more classes. Table A (a first data group) contains records of service objects. A record comprises the key of the service object, version information field and object field. Correspondingly, Table B (a second data group) contains records (name, version and data fields) of classes. In table A, The object field contains serialized state information of the object, and in Table B the data field of a class contains executable codes, some state information and other data in the form of class file. Preferably, the tables are in a relation database.

A desired service is called in using it's service key in Table A. By looking the object version information field, it's possible to search right classes in Table B. Let's figure a service whose key is Service 1 and class Comp1. As can be noticed in FIG. 5, the version information of the service can, for example, be a date when the service was created. The object field of Service 1 also contains name information of classes that belong to the service. The right version of Comp 1 is the version that has been created at the same time or before than Service 1. In this case, Comp 1 and Service 1 were created at the same time, and thus Comp 1 is the acceptable version.

Another example is when a class is older than a service object. This is the case when Service 2 contains Comp 2. Comp 2 was created before Service 2 was created or updated. A third example is when Service N contains Comp N (the lowest row). In this case, Comp N is newer than Service N, and thus not acceptable to use in Service N. There has to be another data record in Table B with the name Comp N (the second lowest row) whose version is equal or older than the version of Service N.

It may also happen that two services have a same key which is the situation concerning Service 3 keys in Table A. However, in this example, Service 3's use different classes— Service 3, whose version information is 05.05.00 uses Comp 3, and Service 3, whose version information is 05.12.99 uses Comp N with the version information 04.12.99.

In the above examples the mapping between Table A and Table B uses the date information in the version fields, but this is not the only solution. Actually, the version information in both tables can be other than a date, such as some kind of version stamp (compare version names of common software in market). Anyway, the date information is convenient to use.

On the other hand, the mapping can be implemented, for example, by using an additional table containing all version information of the service objects and classes from the tables A and B. Additional data or a heuristic algorithm may be needed for mapping, especially when there exist several service objects or classes with the same name.

As mentioned, Java offers a way for handling different class versions, namely SUIDs (stream unique identifier). The SUID is as an abstract (a code) from the interface of a class. When a serialized class is deserialized the SUIDs can be used for verification of the serialized and deserialized class. If the SUID of the serialized class is different than the SUID of the deserialized class, it can be notified that the original serialized class version is different than the new deserialized class version.

However, there are some problems when using SUID for handling different versions. First, SUID checks only the changes in the interface, but there can be changes in other parts of the class. Interfaces change rarely and changes between different class versions are mostly done in other parts of classes. Secondly, only classes of serialized objects would be versioned. Classes that are referred only by code will not be versioned.

It should be noted that the examples above are simplified cases for helping the description of the invention. Other ways exist for constructing an arrangement according to the invention. For example, a data storage that contains the object and class groups (tables) can be seen as a service repository. In the service repository, there are entries, each entry storing an object or a class. An entry is a set of logically associated pieces of information. In the context of this invention an entry comprises the information necessary to store an object or a class. On abstract level an entry comprises a set of attributes each of which may have a value associated with it.

An entry can be implemented in several ways. An entry can be implemented as, for instance, a record or a set of records within a data file. An entry can also comprise a set of records within one or more data files. Similarly, an entry can be implemented as one or more tuples (a data object containing two or more components) within one or more relational database tables.

It should be appreciated that the service repository can be implemented as a database wherein the entries are implemented, for instance, using relational database tuples. Naturally, there could be several physical database records or tuples corresponding to one logical object or class entry.

The service repository can also be implemented as a file system, wherein the said entries are implemented as, for instance, data files.

The service repository can also be internally distributed. The entries can thus be stored in physically separate network nodes. For instance, the entries or groups could be addressed using internet URLs.

It should be appreciated that the said groups can be seen as a logical grouping for the said entries. The entries relating to the said groups may be stored as mixed in the said service repository.

The invention is now described in a context where services are stored to the same place as the classes of the objects they are referencing. This kind of a system could be applied, for instance, in a Java based Intelligent Network execution environment. The services and their objects are stored to a database in association with the execution environment. For each service, a serialized object instance is stored to the database. Either beforehand or on demand a new object instance for the service is deserialized. The deserialization on demand can occur, for instance, when the service is invoked by the subscriber. This invocation is, for example, due to the receiving of a service triggering message to the service execution environment.

In order to enforce version control in association with each serialized service object, there is added a service version identifier field. The deserialization proceeds in the way that when the service object is deserialized, a correct class loader is created using the service version identifier. For instance, this means that the class loader object constructor method has the service version identifier as parameter. Now the class loader object instantiated has in its possession the service version identifier. Another way to achieve this is to fetch a class loader object from the database that corresponds to the service version identifier.

The class loader having the correct service version identifier now fetches from the database only the class versions that are known to work with the service object having the service version identifier. The classes are stored into the database as well. The class names are associated with class version identifiers. In other words, the classes have in the database a primary key with two fields: class name and class version identifier. Now the semantics of the class version identifier can vary depending on the class selection policy. There can be several class selection policies. The objective of the policies is that the class versions are loaded with which the service has been tested.

One policy is such that the classes must be as old as or older than the serialized service. In this policy the version identifiers can be equal to timestamps. Another policy is that there are cross-reference tables, which define for each service version identifier at least one class version identifier for each class.

It can thus be seen that each class loader has its context. The context comprises the relationships between the allowed versions of services, classes and their helper classes. Thus, the context forms a hierarchy.

It should be appreciated that the said class loading means can be, for instance, any means which can hide the class loading from the programmer. The class loader providing the said mapping means could also be implemented by a virtual machine or interpreter directly or by the computer operating system or its associated facility.

Figure 6:
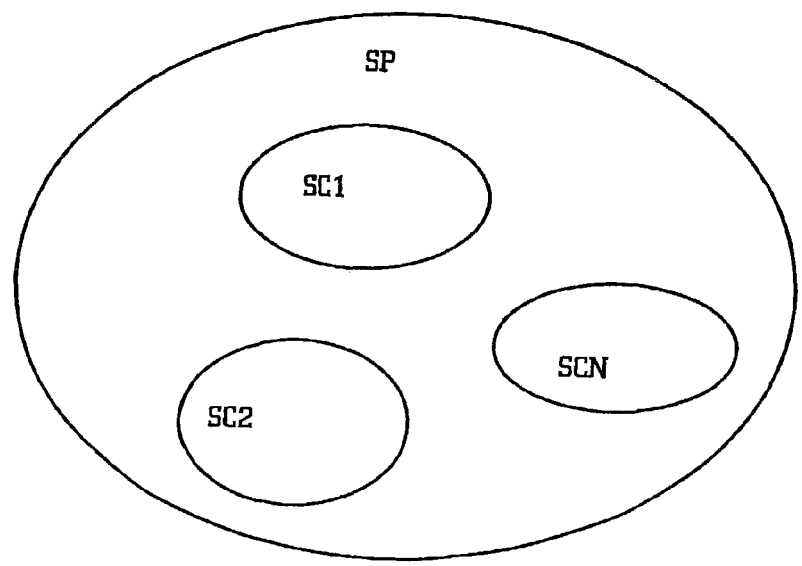
FIG. 6 shows an example of how an application is based on a main service program and service components.

Java is quite a good environment to construct the invention. The above-mentioned initial class loader is a normal element in Java. Serializing is powerful way to use in handling of different versions. However, there is a basic difference between a traditional Java application and an application according to the invention. As a traditional Java application, like in FIG. 6, includes a "root" class (SP) and several other classes (SC 1,SC 2,SC N), who refer to objects, an application according to the invention is based on an object that includes all state information of the service. The object is preferably serialized, and it also includes references to classes belonging to the service. The object also includes references for other objects needed in the service. These other objects have to be serialized as well. In other words, an application according to the invention is constructed conversely than a traditional Java application.

Figure 7:
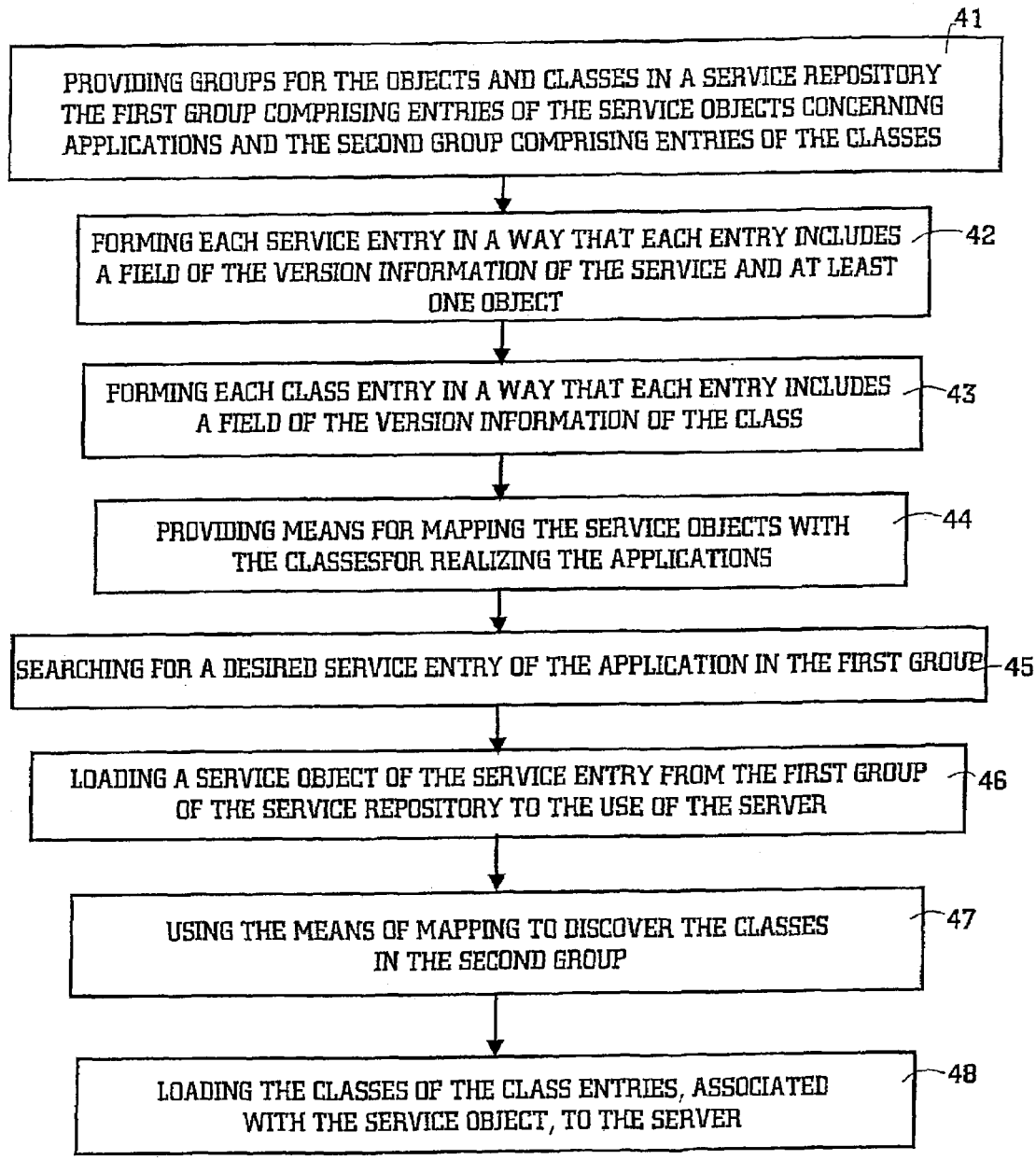
FIG. 7 shows an example of a flow chart describing the method according to the invention.

FIG. 7 illustrates a flow chart, which describes an embodiment of the method according to the invention. First, groups for the services and the classes in the service repository are provided (41), the first group comprising entries of the service objects concerning applications, i.e services and the second group comprising entries of the classes. Each service entry is formed (42) in a way that each entry includes a field for the version information of the object and at least one object. Correspondingly, each class entry is formed (43) in a way that each entry includes a field for the version information of the class. Means for mapping the objects with the classes are provided for realizing the applications.

For executing the application desired the method have to perform certain tasks. A desired service entry of the application is searched (45) in the first group. The service object of the service entry is loaded (46) from the first group from the service repository to the use of the server. The means for mapping are used (47) to discover the classes, in the second group. The classes of the class entries, associated with the service object are loaded (48) to the server.

The invention makes it possible to handle multiple versions of service software. As software evolves, there will be several parallel versions of the same service. A new class working with an old class may cause unexpected fails. Due to this services should be tested in a new environment where there exist class versions created at different times. However, testing is unfeasible on a large server environment where several service applications use the same new component version. There can be hundreds of different services that should be tested for guaranteeing the function of the services. It can be noticed that according to the invention old service classes working together form an old service, and new classes working together form a new service version. Mixing old and new classes for realizing a service do not exist. In other words, none of classes is newer-than-tested.

The invention has been created and described in Java programming language, but that does not mean that this is the only solution. There exist several other object-oriented program environments also, whereby the invention can be realized. Furthermore, it is clear that the invention can be used in many ways in the scope of the inventive idea.

The invention claimed is:

1. A method comprising:
grouping different versions of service applications and classes in at least one service repository into a first group comprising entries of service objects and a second group comprising entries of classes,
forming the entries of the service objects in the first group to include a first information field for representing information about a version of a service and at least one service object,
forming the entries of the classes in the second group to include a second information field for representing information about a version of the class, and
mapping the service objects with the classes to provision the service applications, wherein the different versions of service applications include different versions of a same service application, and wherein the different versions of classes include different versions of a same class,
wherein when executing a desired service application, the method further comprises
searching for a service entry of a desired service application from the first group,
loading a service object of the service entry of the desired service application from the first group for use by at least one server,
using the mapping to discover entries of the classes of the second group associated with said service object of the service entry of the desired service application, and
loading the entries of the classes of the second group associated with said service object of the service entry of the desired service application to the server.

2. A method according to claim 1, wherein the mapping comprises comparing the version of the first information field of entries in the first group with the version of the second information field of the entries in the second group.

3. A method according to claim 1, wherein said loading of said service objects is performed using deserialization of a serialized storage format of the service objects.

4. A method according to claim 1, wherein loading the entries of the classes associated with the said service object is performed using a class loader.

5. A method according to claim 4, further comprising constructing at least one class loader based on the information in the first information field.

6. A method according to claim 5, wherein the class loader uses the mapping for loading the classes from the second group.

7. A method according to claim 1, the method further comprising using additional data when mapping service objects with classes.

8. A method according claim 1, the method further comprising using at least one database to provide the service repository.

9. A method according claim 1, the method further comprising providing the service repository using at least one file system.

10. A system comprising:
at least one service repository;
at least one server;
a first group in the at least one service repository comprising entries of service objects, wherein at least one of an entry of the service objects comprises a first information field to represent information about a version of a service and at least one service object,
a second group in the at least one service repository comprising an entry of a class, wherein at least one of an entry of a class comprises a second information field to represent information about a version of a class, and
a mapping unit configured to map the service objects with the classes for provisioning of the service application,
wherein different versions of service applications include different versions of a same service application, and wherein different versions of classes include different versions of a same class,
wherein when executing a desired service application, the system is configured to:
search for a service entry of a desired service application from the first group,
load a service object of the service entry of the desired service application from the first group for use by the at least one server,
use the mapping to discover entries of the classes of the second group associated with said service object of the service entry of the desired service application, and
load the entries of the classes of the second group associated with said service object of the service entry of the desired service application to the server.

11. The system according to claim 10, wherein the at least one server contains a service loader configured to load the at least one service object from the at least one service repository.

12. The system according to claim 11, further comprising a version specific class loader formed after the service loader loads the desired service objects of the service from the first group.

13. The system according to claim 12, wherein the version specific class loader is configured to use the mapping unit to load the classes from the second group.

14. The system according to claim 13, wherein the mapping unit is configured to use the version of the first information field of entries in the first group.

15. The system according to claim 11, further comprising a special predetermined class loader.

16. The system according to claim 15, wherein the special predetermined class loader is configured to use the mapping unit to load the classes from the second group.

17. The system according to claim 16, wherein the mapping unit is configured to use the version of the first information field of entries in the first group.

18. The system according to claim 10, wherein the mapping unit is configured to use additional data when mapping the service objects with the classes.

19. The system according to claim 10, wherein the at least one service repository comprises at least one database.

20. The system according to claim 10, wherein the at least one service repository comprises at least one file system.

21. A system comprising:
at least one service repository;
at least one server;
a first group means in the at least one service repository comprising entries of service objects, wherein at least one of an entry of the service objects comprises a first information field for representing information about a version of a service and at least one service object;
a second group means in the at least one service repository comprising an entry of a class, wherein at least one of an entry of a class comprises a second information field for representing information about a version of a class, and
mapping means for mapping the service objects with the classes for provisioning of the service application,
wherein different versions of service applications include different versions of a same service application, and wherein different versions of classes include different versions of a same class,
wherein when executing a desired service application, the system further comprises
means for searching for a service entry of a desired service application from the first group means,
means for loading a service object of the service entry of the desired service application from the first group means for use by the at least one server,
means for using the mapping to discover entries of the classes of the second group associated with said service object of the service entry of the desired service application, and
means for loading the entries of the classes of the second group associated with said service object of the service entry of the desired service application to the server.

22. An apparatus comprising:
at least one server configured to:
group different versions of service applications and classes in at least one service repository into a first group comprising entries of service objects and a second group comprising entries of classes,
form the entries of the service objects in the first group to include a first information field to represent information about a version of a service and at least one service object,
form the entries of the classes in the second group to include a second information field to represent information about a version of the class, and
map the service objects with the classes to provision the service applications,
wherein different versions of service applications include different versions of a same service application, and wherein different versions of classes include different versions of a same class,
wherein when executing a desired service application, the apparatus is configured to:
search for a service entry of a desired service application from the first group,
load a service object of the service entry of the desired service application from the first group for use by the at least one server,
use the mapping to discover entries of the classes of the second group associated with said service object of the service entry of the desired service application, and
load the entries of the classes of the second group associated with said service object of the service entry of the desired service application to the at least one server.

23. The apparatus according to claim 22, wherein the apparatus is configured to compare the version of the first information field of entries in the first group with the version of the second information field of the entries in the second group.

24. The apparatus according to claim 22, wherein said loading of said service objects is performed using deserialization of a serialized storage format of the service objects.

25. The apparatus according to claim 22, wherein said loading of the entries of the classes associated with the said service object is performed using a class loader.

26. The apparatus according to claim 22, wherein the apparatus is configured to construct at least one class loader based on the information in the first information field.

27. The apparatus according to claim 26, wherein the class loader is configured to use the mapping to load the classes from the second group.

28. The apparatus according to claim 22, wherein additional data is used when mapping service objects with classes.

29. The apparatus according to claim 22, wherein at least one database is used to provide the service repository.

30. The apparatus according to claim 22, wherein the service repository is provided using at least one file system.

31. A computer program, embodied on a computer-readable storage medium, the computer program configured to control a processor to perform a method comprising:
grouping different versions of service applications and classes in at least one service repository into a first group comprising entries of service objects and a second group comprising entries of classes,
forming the entries of the service objects in the first group to include a first information field for representing information about a version of a service and at least one service object,
forming the entries of the classes in the second group to include a second information field for representing information about a version of the class, and
mapping the service objects with the classes to provision the service applications, wherein different versions of service applications include different versions of a same service application, and wherein different versions of classes include different versions of a same class,
wherein when executing a desired service application, the method further comprises:
searching for a service entry of a desired service application from the first group,
loading a service object of the service entry of the desired service application from the first group for use by at least one server;
using the mapping to discover entries of the classes of the second group associated with said service object of the service entry of the desired service application, and
loading the entry of the classes of the second group associated with said service object of the service entry of the desired service application to the server.

* * * * *